United States Patent [19]

Svec

[11] Patent Number: 5,765,345
[45] Date of Patent: Jun. 16, 1998

[54] DEEP DRAW PACKAGE AND SYSTEM FOR MAKING SAME, INCLUDING APPARATUS AND METHOD

[75] Inventor: James A. Svec, Bloomingdale, N.J.

[73] Assignee: Ivers-Lee Corporation, West Caldwell, N.J.

[21] Appl. No.: 129,238

[22] Filed: Sep. 29, 1993

[51] Int. Cl.⁶ .................... B65B 47/02; B65B 47/04
[52] U.S. Cl. .................... 53/453; 53/546; 53/559
[58] Field of Search .................... 53/453, 454, 559, 53/560, 546

[56] References Cited

U.S. PATENT DOCUMENTS

| | | | |
|---|---|---|---|
| 2,490,781 | 12/1949 | Cloud | 53/453 |
| 3,124,913 | 3/1964 | Arcudi et al. | |
| 3,127,718 | 4/1964 | Arcudi et al. | |
| 3,492,773 | 2/1970 | Bergstrom | 53/453 X |
| 4,034,536 | 7/1977 | Mahaffy et al. | 53/453 |
| 4,225,553 | 9/1980 | Hirota et al. | 264/292 |
| 4,361,020 | 11/1982 | Hirota et al. | 72/57 |
| 4,365,498 | 12/1982 | Hirota et al. | 72/351 |
| 4,365,499 | 12/1982 | Hirota et al. | 72/351 |
| 4,366,663 | 1/1983 | Grebe | 53/559 |
| 4,603,541 | 8/1986 | Medwed | 53/559 X |
| 4,915,230 | 4/1990 | Mancini | 53/453 X |
| 5,187,921 | 2/1993 | Wilson et al. | 53/453 |
| 5,193,265 | 3/1993 | Muggli et al. | 29/527.4 |
| 5,199,595 | 4/1993 | Muggli et al. | 220/450 |
| 5,205,110 | 4/1993 | Buchko | 53/559 X |

*Primary Examiner*—James F. Coan
*Attorney, Agent, or Firm*—Woodcock Washburn Kurtz Mackiewicz & Norris LLP

[57] ABSTRACT

A system of the present invention includes a deep draw package enclosing a three dimensional item such as for example a blood collection tube or the like, and an apparatus and method for making the same. The deep draw package includes an upper film and a lower film each having a cavity formed therein, with the films sealingly joined together along the periphery of the cavities to form an item containing compartment therein. A tab member is provide along one edge of the films to facilitate opening of the package. The apparatus and method of the present invention include a number of sub-assemblies for providing an upper film and a lower film, forming cavities in the films, placing the item in one of the cavities, sealing the films together along the periphery of the cavities to form a continuous web and cutting the continuous web into strips having the desired number of packages formed therein. The sub-assembly for forming the cavities in the films includes a female die member, a male die member and a polymeric back-up plate to relieve stress during the formation of the cavities in the films.

14 Claims, 6 Drawing Sheets

DEEP DRAW PACKAGE AND SYSTEM FOR MAKING SAME, INCLUDING APPARATUS AND METHOD

FIELD OF THE INVENTION

The present invention generally relates to packages for three-dimensional items, including blood collection tubes, syringes, and the like, and more specifically relates to a deep draw package for hermetically enclosing or storing such three dimensional items. In addition, the present invention relates to an apparatus and method for making such packages.

BACKGROUND OF THE INVENTION

Individual packages for three dimensional items are well know in the art and are typically made or otherwise formed from foil or polymeric materials. However, several problems and limitations have been associated with the use of such packages including the use thereof for items which because of their size and outer dimensions require deep drawing which prior hereto required air compressors and pharmaceutical quality filtering systems. Also, such packages were prone to stress cracks at the corners and other contours which rendered such packages unacceptable for hermetically sealing medical items such as blood collection tubes.

Thus, there has been a need for a deep draw package, as well as an apparatus and method for making the same, which would eliminate the problems and limitations associated with the prior packages discussed above, most significant of the problems being associated with deep drawing and hermetically sealing the package.

SUMMARY OF THE INVENTION

In contrast to the prior packages discussed above, it has been found that a deep draw package particularly suited for use with three dimensional medical items can be constructed in accordance with the present invention. In addition, the deep draw package of the present invention can be hermetically sealed, and due to its resilient construction, can maintain the integrity of the package during shipping and handling. Also the deep draw package of the present invention can be formed in accordance with the method of the present invention to relieve the stress in the film to prevent stress cracks at the corners and other contours.

The deep draw package of the present invention for containing a three dimensional item such as a blood collection tube and the like includes an upper film of a poly-laminate material having an inner surface and an outer surface, with an outwardly projecting lower cavity formed therein by clamping the film between a back-up plate including a polymeric material and a female die member and then clamping the female member and a male member together with the back-up plate therebetween, a lower film of a poly-laminate material having an inner surface and an outer surface, with an outwardly projecting upper cavity formed therein, with the lower film and the upper film being sealingly joined together along the periphery of their respective cavities such that a hermetically sealed compartment is formed between the films and the compartment defined by the upper cavity and the lower cavity, with an item contained in the compartment.

In the preferred embodiment, the deep draw package further includes a tab member situated along a portion of the periphery of the films whereby the tab member may be gripped to at least partially separate the upper film and the lower film to expose the item contained in the compartment. In addition, the poly-laminate material includes layers of PVC, Nylon and Aluminum.

The method of making a deep draw package of the present invention includes the steps of providing an upper film and a lower film of a poly-laminate material, clamping each film and forming a cavity in each film, placing an item in the cavity formed in one of the films, bringing the films in contact with one another so that the cavities define a compartment for enclosing the item, and sealing the films together.

In the preferred embodiment, the method of forming the deep draw package further includes the step of cutting a continuous web into strips including one or more deep draw packages. In addition, the step of sealing the films together to form a continuous web includes the step of heat sealing the films. Also, the step of forming cavities in each film includes the steps of placing each film between a die assembly and clamping the die assembly together, and the step of holding the film includes clamping the film between a female member and a back-up plate including a polymer material so that the elastomer properties of the material allows the proper amount of creep and displacement to relieve the stress in the films and to prevent stress cracks when the die assembly is brought together. Further, the method of forming the deep draw package includes the step of forming a tab member along at least one edge of the films.

The apparatus for making a deep draw package of the present invention includes means for providing an upper film and a lower film of a poly-laminate material, means for holding each film, means for forming a plurality of cavities in each film, means for placing at least one item in one of the cavities in either the upper film or the lower film, and means for sealing the films together with at least one of the cavities formed therein to define an individual item containing compartment.

In the preferred embodiment of the apparatus, the means for sealing the films together is adapted to form a continuous web and includes heat sealing means. Also, the means for forming the cavities includes a die assembly having a female member and a male member, and the means for holding each film includes a back-up plate having at least a layer of polymer material so that when the back-up plate and the female member are clamped together with one of the films therebetween, the elastomer properties of the polymeric material allows the proper amount of creep and displacement to relieve the stress in the film and prevent stress cracks. The apparatus further includes means for cutting the continuous web into individual strips having at least one deep draw package therein. In addition, the means for cutting the continuous web includes razors.

BRIEF DESCRIPTION OF THE DRAWINGS

The various features, objects, benefits, and advantages of the present invention will become more apparent upon reading the following detailed description of the preferred embodiments along with the appended claims in conjunction with the drawings, wherein like reference numerals identify corresponding components, and:

DETAILED DESCRIPTION OF THE PREFERRED EMBODIMENT(S)

Figure 1:
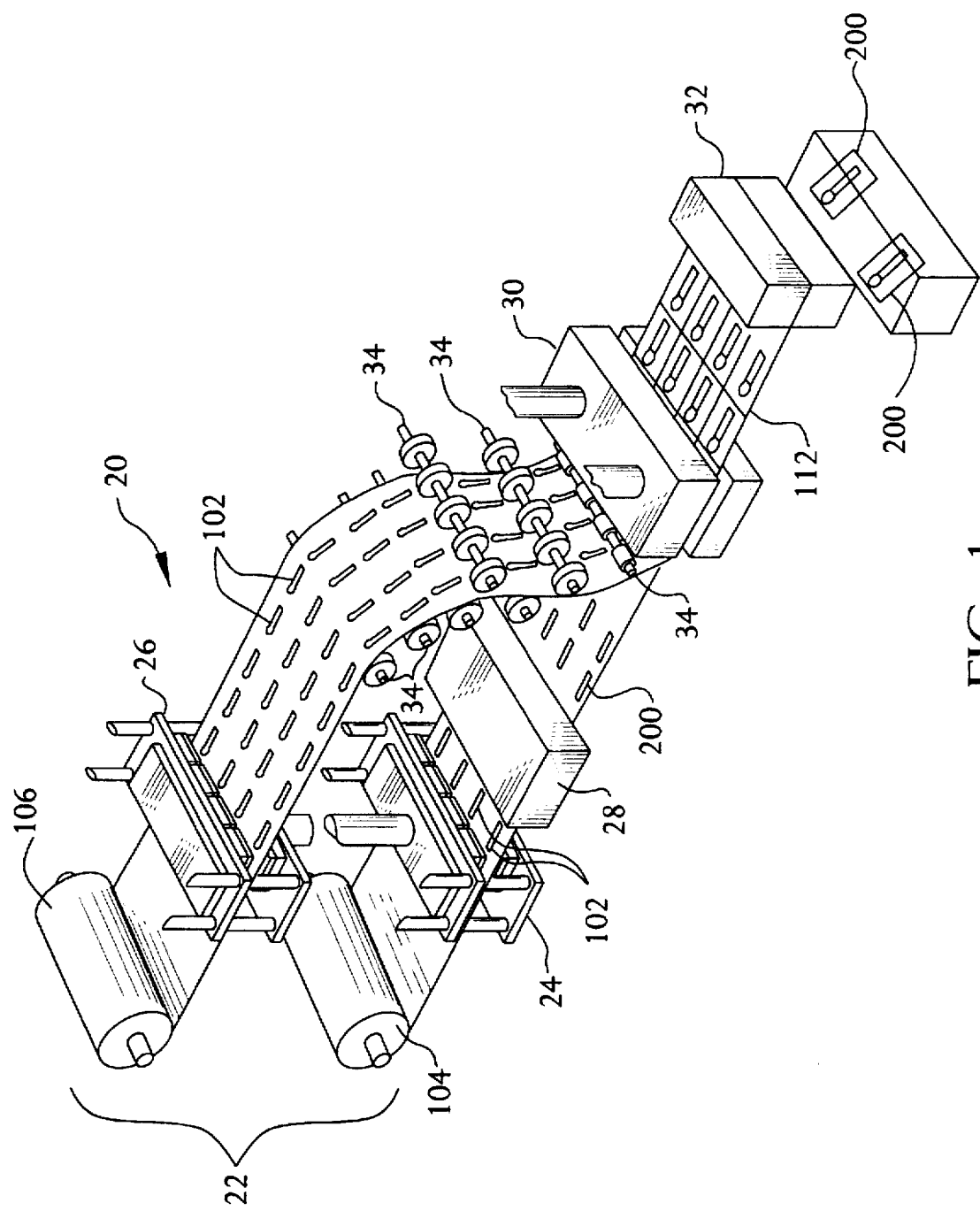
FIG. 1 is a perspective schematic view of the apparatus of the system of the present invention illustrating the various sub-assemblies for making the deep draw package.
Figure 2:
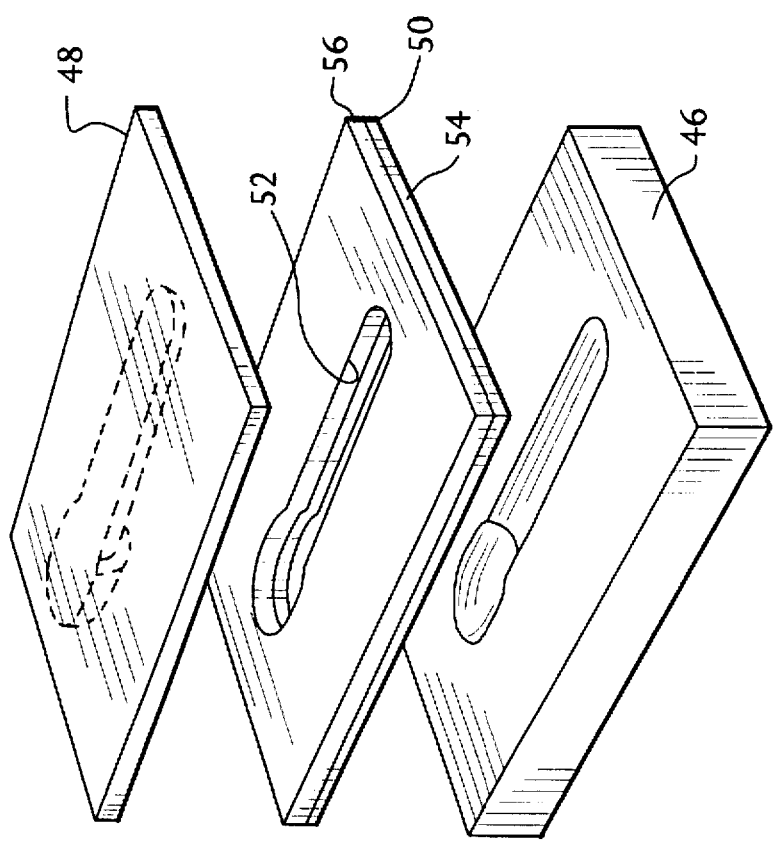
FIG. 2 is an exploded perspective view of the die assembly for forming the cavity in the film.

The system of the present invention is illustrated in FIGS. 1–8, with the apparatus generally designated as 20 the deep draw package generally designated as 100.

Referring to FIG. 1, and FIGS. 2–5 and 7–8 for greater detail, the apparatus 20 of the present invention includes a number of sub-assemblies 22, 24, 26, 28, 30 and 32 for processing and forming a plurality of cavities 102 in each film 104, 106, placing the item 200 to be contained in the package on the lower film 104, sealing the lower film 104 and the upper film 106 together so that the cavities form item containing compartments or pockets 110 in a continuous web 112 from which the deep draw packages 100 are ultimately cut.

Specifically, the apparatus includes the sub-assembly 22 for separately feeding the lower film 104 and the upper film 106 into a pair of similar sub-assemblies 24, 26, with the subassembly 24 forming the plurality of lower cavities 102A in film 104 and the sub-assembly 26 forming the plurality of upper cavities 102B in film 106, with the cavities being formed outwardly relative to one another so that when subsequently brought together, the item 200 may be enclosed therein. Next, the sub-assembly 28 places an item 200 in each lower cavity 102A, with the items extending beyond the cavity. The films 104, 106 are then brought into contact with one another, with the cavities aligned with one another so that the upper cavities 102B in the upper film enclose the portions of the items extending from the lower cavities 102A. Next, the films 104, 106 are sealed together by sub-assembly 30 along the areas surrounding the periphery of the cavities to form the continuous web.

Figure 6:
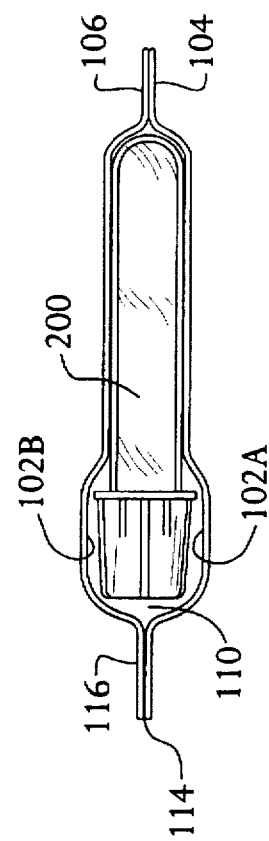
FIG. 6 is a partial cross-section view of the deep draw package of the present invention with a blood collection tube contained therein.

The sub-assembly 32 then cuts the continuous web into individual deep draw packages 100 illustrated in FIG. 6. In addition, as will be readily apparent to one skilled in the art, the continuous web 110 may also be cut into strips or sheets for ease of transporting and handling, with the individual packages 100 defined by score lines for later separation.

In the preferred embodiment of the deep draw package 100 illustrated in FIG. 6, the upper and lower films 104, 106 forming the continuous web 112 are each comprised of a poly-laminate of PVC, Nylon and Aluminum available from Alusuisse, and known as 25 OPA/45AL/60PP. The particular laminate or other material is not essential to the present invention and preferably has sufficient strength and the ability to be heat sealed together. Accordingly, in the preferred embodiment, the apparatus 20 of the present invention includes a plurality of film handling guide roller sub-assemblies 34 so that the upper and lower films 104, 106 do not bend at angles greater than 90 degrees as they move through the apparatus after the cavities 102 have been formed therein, and preferably at angles substantially less than 90 degrees.

Figure 3:
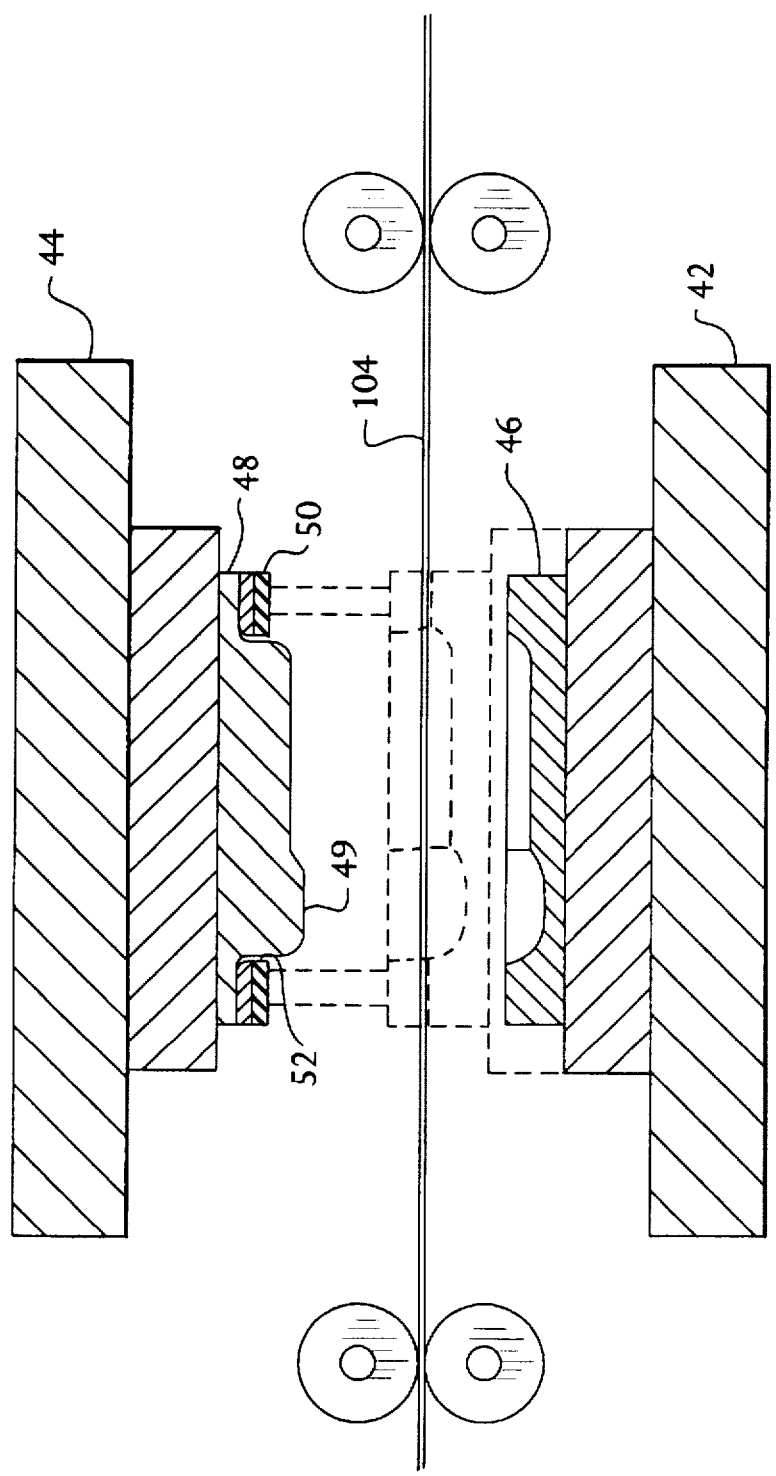
FIG. 3 is an enlarged fragmentary view of one of the sub-assemblies illustrated in FIG. 1 showing the feeding of film between the female and male members of the die assembly.
Figure 5:
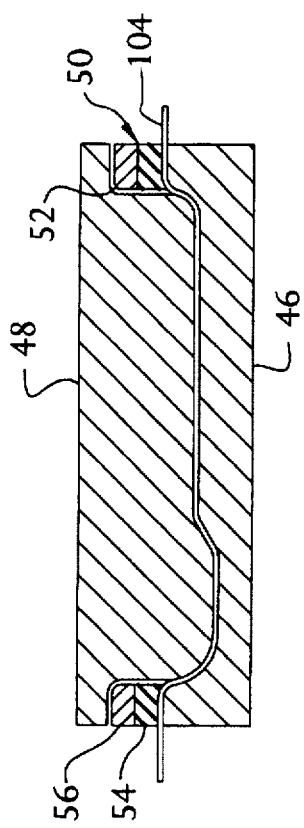
FIG. 5 is an cross-sectional view of the die assembly illustrated in FIG. 3 with the film clamped therein.
Figure 4:
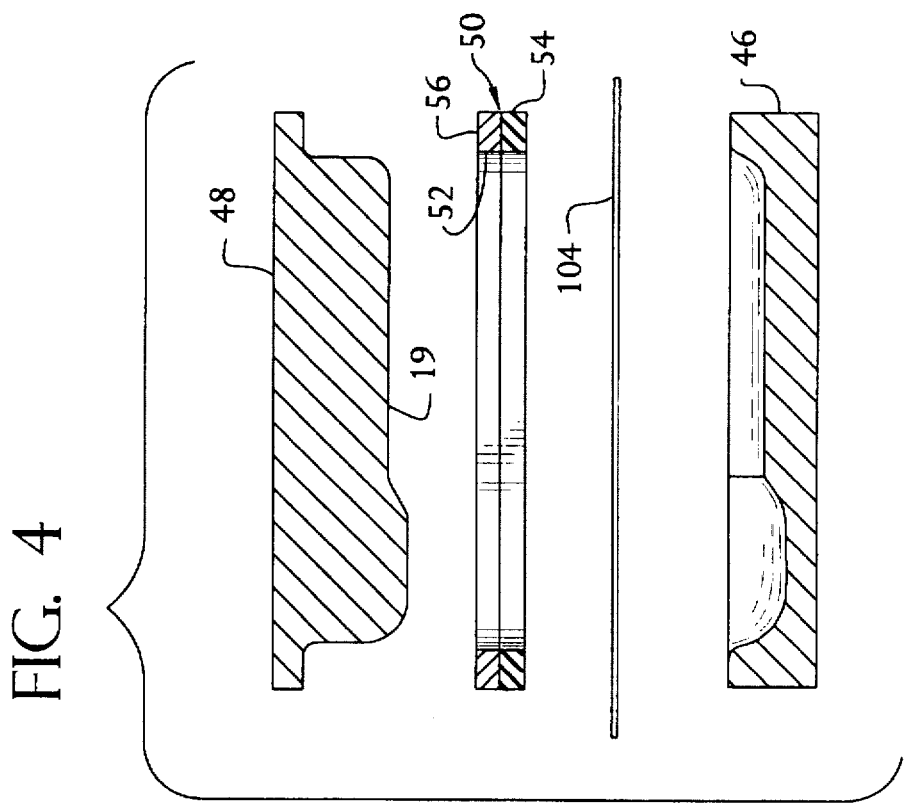
FIG. 4 is an cross-sectional view of the die assembly illustrated in FIG. 3 prior to clamping the film therein.
Figure 8:
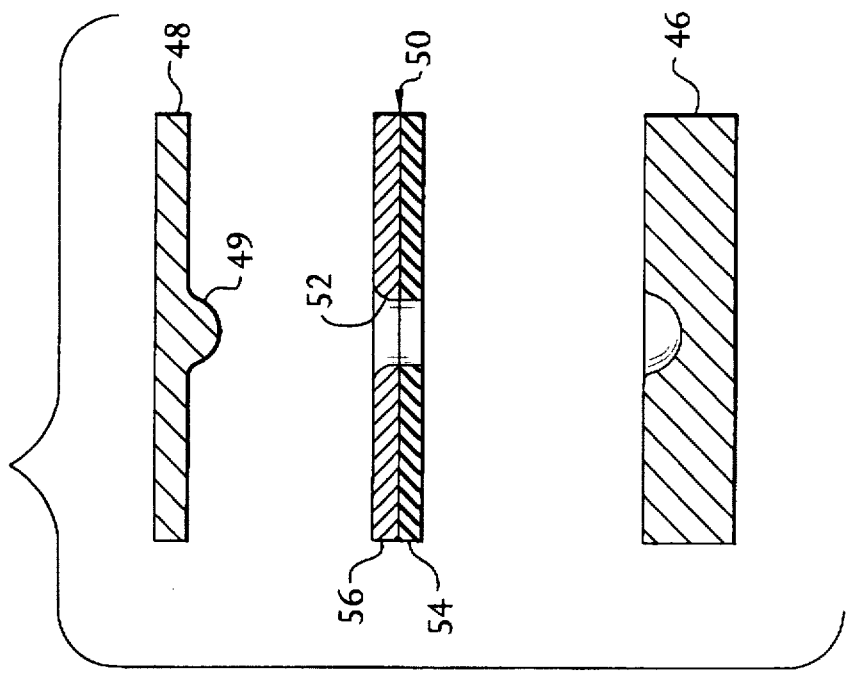
FIG. 8 is an exploded end view of the die assembly illustrated in FIG. 2 showing the opposite end of the die assembly as illustrated in FIG. 7.
Figure 7:
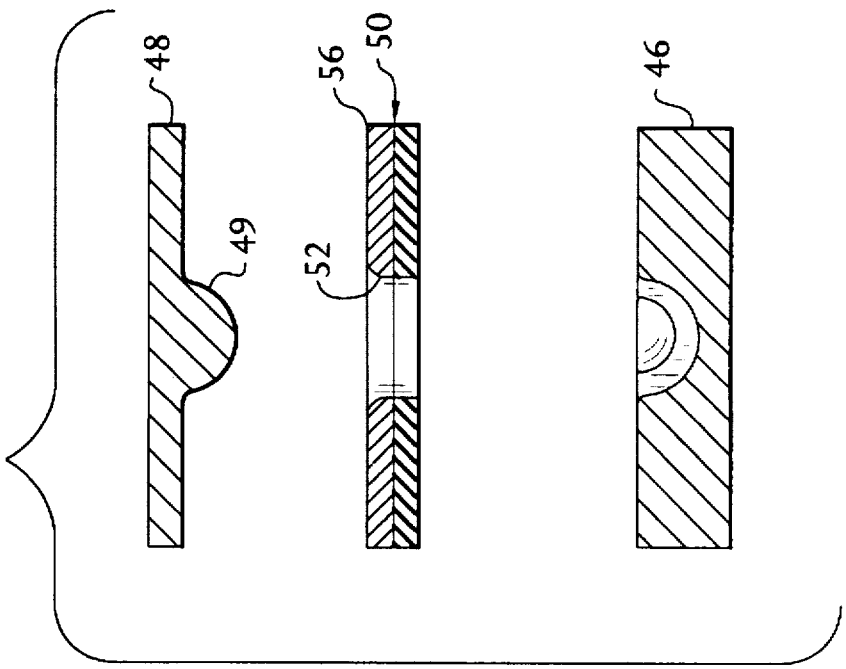
FIG. 7 is an exploded end view of the die assembly illustrated in FIG. 2.

As illustrated in FIG. 3, and in greater detail in FIGS. 2, 4, 7 and 8, after the rolls of film are unwound from the rolls, each film 104, 106 is feed into its corresponding sub-assembly 24, 26 for forming the cavities therein. For example, the sub-assembly 24 includes a die assembly having a bottom plate 42 and a top plate 44 mounted to a frame, with at least one of the plates being movable in the vertical direction relative to the other plate by an actuating cylinder (FIG. 4). The way in which the plates are brought together is not essential to the present invention and may include a number of means known in the art as disclosed for example in U.S. Pat. Nos. 3,127,718 (Arcudi et al.) and 3,124,913 (Arcudi et al.), the disclosures of which are hereby incorporated by reference in their entirety.

In the preferred embodiment, a female die member 46 is mounted to the bottom plate and a male die member 48 having a male forming plug 49 is mounted to the top plate, with a back-up plate 50 situated between the female and male members. The back-up plate has a hole or like opening 52 corresponding to the shape of the plug 49 to allow passage of the plug 49 when the two die members are brought together with the back-up plate therebetween. In the preferred embodiment, the back-up plate 50 is separately reciprocating and as illustrated in FIG. 3 is first clamped or otherwise held against the female die member 46 so that when the male die member 48 is brought into contact with the female die member, the film is under tension along its periphery edges. In this way, the plug 49 passes through the opening 52 and draws the film into the female die 46, making the required shape of the cavity 102A for the item 200 to be placed therein. The cavity forming process is done horizontally on the upper and lower films 104, 106.

The back-up plate 50 includes a polymeric material or preferably a layer 54 thereof laminated to a layer of steel or similar material 56. The polymeric material is selected so that as the film 104 is held under tension as the male forming member passes through the opening 52 into the female die member 46, the film is drawn into the female die 46 by the advancing male plug 49 (FIG. 5), with the polymeric material of the back-up plate 50 allowing the proper amount of creep or displacement relieving the stress in the film to prevent stress cracks at the corners or other contours. By selecting different types, duromters and thicknesses of the polymeric material, as well as holding pressure, the creep can be controlled. The sub-assemblies 24, 26 can be hydraulically or mechanically clamped.

Next, as illustrated in FIG. 1, the item 200 is placed between the films 104, 106 by the sub-assembly 28 as is well known in the art, which in the preferred embodiment includes a pick and place device. The three dimensional item 200 can be varied and is not essential to the present invention, which in the illustrated embodiment includes a blood collection tube such as the type know in the art as a Falcon tubes (FIG. 6).

As explained, in the preferred embodiment, the films 104, 106 are processed through the apparatus 20 along separate tracks through the sub-assemblies 24, 26 for forming the cavities 102 and the sub-assembly 28 for placing the items in the cavities. Thereafter, the two films 104, 106 are brought together and heat sealed around the outer periphery of the cavities by sub-assembly 30 to form the continuous web 102, with each item being sealed within a corresponding compartment 110. A free zone 114, which in the preferred embodiment includes a tab 116 extending into the free zone for gripping and peeling the deep draw package apart. Next the continuous web is die cut into individual packages or other configurations such as sheets, strips or the like having the desired number of packages 100.

The sub-assembly 30 for sealing the films together is not essential to the present invention and may include nip rollers as disclosed, for example, in U.S. Pat. Nos. 3,127,718 (Arcudi et al.) and 3,124,913 (Arcudi et al.).

The materials and components used for constructing the various sub-assemblies are not essential to the present invention and may be made from a variety of commercially available components well known to those skilled in the art. Normally, manufacturers of the present apparatus and package will select the various materials and components, based upon price, availability and application.

Operation and Use

Figure 9:
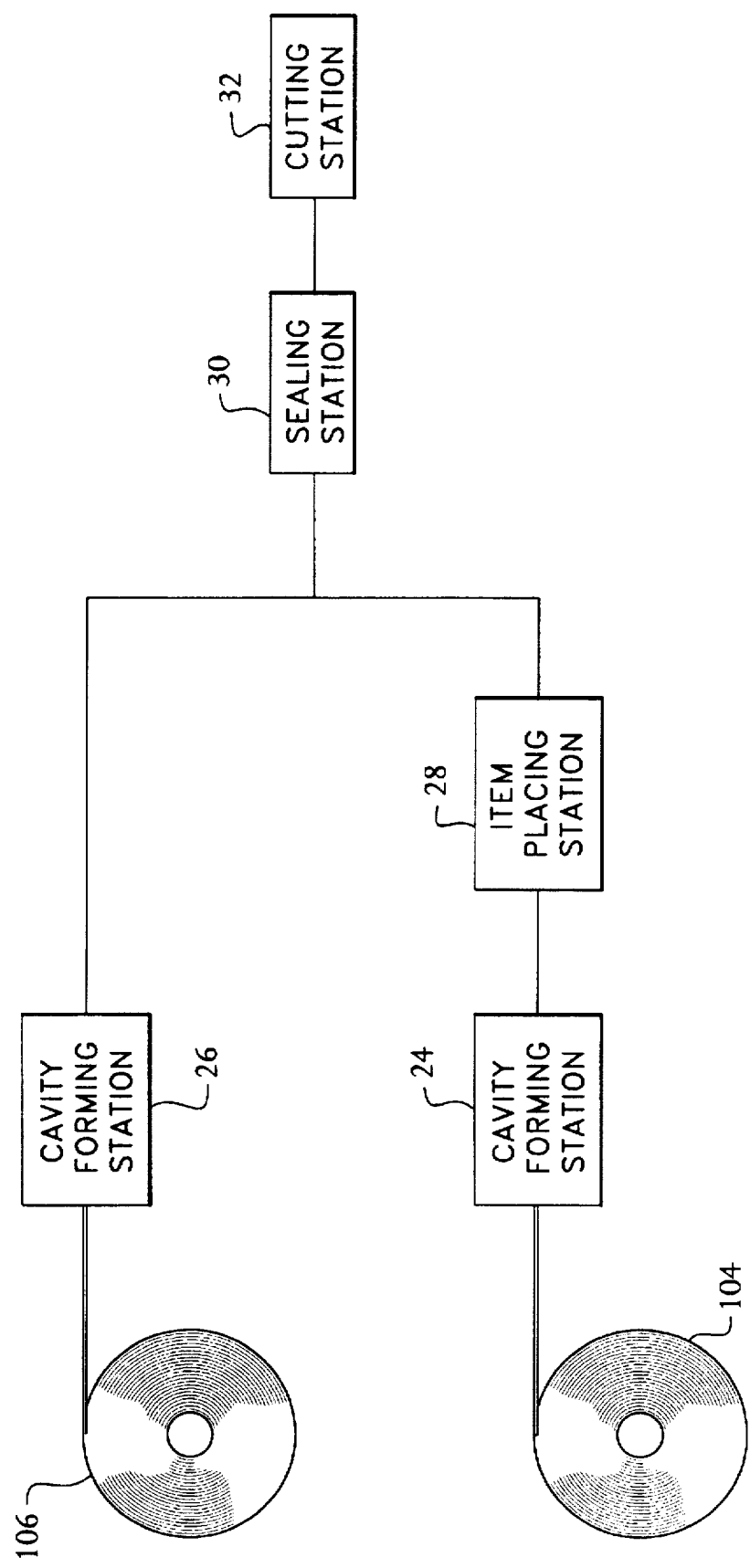
FIG. 9 is a logic flow diagram depicting the various steps of the method for making the deep draw package of the present invention.

The operation of the system of the present invention in connection with the apparatus 20 illustrated in FIGS. 1–5 and 7–8 will now be explained with reference to the flow diagram shown in FIG. 9 illustrating the various stations making up the sub-assemblies 22, 24, 26, 28, 30 and 32.

As explained, in the preferred embodiment, the films 104, 106 are processed through the apparatus 20 along separate tracks through the sub-assemblies 24, 26 for forming the cavities, with the film 104 then passing beneath the sub-assembly 28 for placing the item in each cavity 102. Thereafter, the two films 104, 106 are brought together and heat sealed by the sub-assembly 30 to form the continuous web 112 from which the deep draw packages 100 are die cut, which in the preferred embodiment includes a tab 116 extending into the free zone 114 for gripping and peeling the package apart.

The deep draw package 100 of the present invention as illustrated in FIG. 6 will now be explained and can be used by gripping the tab 116 to at least partially pull the films 104, 106 apart to expose the item 200 contained in the compartment 110.

In addition, the deep draw package 100 of the present invention can be fabricated or otherwise cut from the continuous web 112 into a number of shapes and lengths other than that shown in the drawings for ease of transporting and handling. Also, the deep draw package can be made in different sizes depending upon the shape of the three dimensional item to be contained therein.

While a preferred embodiment of the present invention has been described so as to enable one skilled in the art to practice the system, including the deep draw package, apparatus and method, of the present invention, it is to be understood that variations and modifications may be employed without departing from the concept and intent of the present invention as defined in the following claims. The preceding description is intended to be exemplary and should not be used to limit the scope of the invention. The scope of the invention should be determined only by reference to the following claims.

What is claimed is:

1. A method of making a deep draw package comprising the steps of:

providing an upper film and a lower film of a poly-laminate material;

providing a first and second die assembly for forming a cavity in each one of said upper and lower films, each one of said die assemblies having a female member, a male member, and a back-up plate, said back-up plate comprising a layer of a polymeric material;

clamping each one of said films between a respective female member, back-up plate, and male member to form a cavity in each film so that the elastomer properties of the layer of polymeric material on said back-up plate allows the proper amount of creep and displacement to relieve the stress in the films and to prevent stress cracks when the female member and male member are brought together;

placing an item in said cavity formed in one of the films;

bringing said films in contact with one another so that said cavities define a compartment for enclosing said item; and sealing said films together to form a continuous web.

2. The method of forming the deep draw package defined in claim 1, further comprising the step of cutting said continuous web into strips including one or more deep draw packages.

3. The method of forming the deep draw package defined in claim 1, wherein said step of sealing said films together to form a continuous web includes the step of heat sealing said films.

4. The method of forming the deep draw package defined in claim 1, further comprising the step of forming a tab member along at least one edge of said films.

5. A method of making a deep draw package comprising the steps of:

providing a first packaging film and a second film;

providing a die assembly for forming a cavity said first film, said die assembly having a female member, a male member, and a back-up plate, said back-up plate comprising a layer of a polymeric material;

clamping said first film between said female member, back-up plate, and male member to form a cavity in said first film so that the elastomer properties of the layer of polymeric material on said back-up plate allows the proper amount of creep and displacement to relieve the stress in the films and to prevent stress cracks when the female member and male member are brought together;

placing an item in said cavity formed in said first film;

bringing said fist and second films in contact with one another so that said cavity defines a compartment for enclosing said item; and sealing said films together to form a continuous web.

6. The method of forming the package in claim 5, further comprising the step of:

cutting said continuous web into strips including one or more deep draw packages.

7. The method of forming the package defined in claim 5, wherein the step of sealing said films together to form the continuous web further comprises:

heat sealing said film together.

8. The method of forming the package in claim 5 further comprising the step of:

forming a tab member along at least one edge of said films.

9. The method of forming the package in claim 5 wherein the step of providing a first packaging film and a second film further comprises the step of:

providing at least one poly-laminate packaging film.

10. An apparatus for making a deep draw package, comprising:

means for providing an upper film and a lower film of a poly-laminate material;

two cavity forming members for forming a plurality of cavities in each film, each one of said cavity forming members being coupled to said means for providing an upper and lower film, each one of said cavity forming members comprising a female member and male member;

two holding members for holding a respective film, said holding members being coupled to a respective cavity forming member, each one of said holding members comprising a back-up plate having at least a layer of a polymeric material so that when said back-up plate, female member and said male member are clamped together with one of said films therebetween, the elastomer properties of the polymeric material allows the proper amount of creep and displacement to relieve the stress in the film and prevent stress cracks;

means for placing at least one item in one of said cavities in either said upper film or said lower film; and means for sealing said films together with at least one of said cavities formed therein to define and individual item containing compartment.

11. The apparatus defined in claim 10, wherein said means for sealing said films together is adapted to form a continuous web and includes heat sealing means.

12. The apparatus defined in claim 11, further comprising means for cutting said continuous web into individual strips having at least one deep draw package therein.

13. The apparatus defined in claim 12, wherein said means for cutting said continuous web includes razors.

14. An die assembly for forming a cavity in a sheet of packaging film material, said die assembly comprising:

a female member;

a male member movably coupled with the female member such that a sheet of film material can be placed between the male and female members and the male and female members can mate with one another to form a cavity in the sheet of film material; and a back-up plate having a layer of a polymeric material having elastomer properties, said back-up plate mechanically coupled with said female member and male member and adapted to communicate with the sheet of film material when the female and male member mate with one another such that the polymeric material layer relieves the stress in the film to prevent stress cracking in the film material.

* * * * *